US006977921B1

(12) United States Patent
Dolan

(10) Patent No.: US 6,977,921 B1
(45) Date of Patent: Dec. 20, 2005

(54) USING DISCRETE MESSAGE-ORIENTED SERVICES TO DELIVER SHORT AUDIO COMMUNICATIONS

(75) Inventor: Michael Francis Dolan, Bolingbrook, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/136,678

(22) Filed: Aug. 19, 1998

(51) Int. Cl.[7] ............................................. H04L 12/66
(52) U.S. Cl. ...................... 370/352; 370/401; 370/474; 379/67.1; 455/466
(58) Field of Search ............................... 370/468, 260, 370/265, 351, 352–356, 401, 473; 379/67, 379/88, 89, 202; 709/202, 204, 221; 455/414, 455/456, 466

(56) References Cited

U.S. PATENT DOCUMENTS

| | | | |
|---|---|---|---|
| 5,446,678 A | | 8/1995 | Saltzstein et al. ....... 364/514 R |
| 5,557,659 A | * | 9/1996 | Hyde-Thomson ........ 379/88.13 |
| 5,630,205 A | | 5/1997 | Ekelund .................... 455/54.1 |
| 5,694,454 A | | 12/1997 | Hill et al. ...................... 379/58 |
| 5,706,211 A | * | 1/1998 | Beletic et al. .............. 709/206 |
| 5,754,946 A | | 5/1998 | Cameron et al. |
| 5,903,726 A | * | 5/1999 | Donovan et al. ........... 709/206 |
| 5,950,123 A | * | 9/1999 | Schwelb et al. ......... 455/414.4 |
| 6,018,654 A | * | 1/2000 | Valentine et al. ........ 455/414.4 |
| 6,304,636 B1 | * | 10/2001 | Goldberg et al. ........ 379/88.14 |
| 6,421,707 B1 | * | 7/2002 | Miller et al. ................ 709/206 |
| 6,532,230 B1 | * | 3/2003 | Lung et al. ................. 370/352 |

FOREIGN PATENT DOCUMENTS

| | | |
|---|---|---|
| WO | WO 96/05691 | 2/1996 |
| WO | WO 98/09453 | 3/1998 |

OTHER PUBLICATIONS

VocalTech Communications Ltd , Internet Phone User Manual, pp. 1-64, Nov. 1997.*

* cited by examiner

Primary Examiner—Frank Duong

(57) ABSTRACT

Delivery of short audio communications to remote end user devices uses discrete message-oriented service messages for delivery of the audio messages. Audio information is captured, encoded by means of audio compression technology, and stored at a message center. Alternatively, the audio information may be stored in an uncompressed format and compressed immediately before delivery. The compressed audio information is transmitted by means of Short Message Service or another discrete message-oriented service to the end user device, where it is decompressed and played to the recipient. Message delivery can be accomplished in parallel with some other ongoing activity at the end user device. The major fields in a Short Message Service message used to carry encoded audio information are a Type of Data field, including information on the type of translator needed to decompress the message field, a Short Message Identifier, a Length field, and the coded audio information. If the audio information is too large to be contained in a single Short Message, segmentation and reassembly techniques commonly known in the art are applied to break the information into segments, each of which is placed into a separate Short Message having the fields: Type of Data; Short Message Identifier; Total Segments; Number of Enclosed Segment; Segment Length; and Coded Audio Information Segment. At the end user device, the Short Message can be stored until the end user listens to the audio information. The intervening network can be a radio link, the Internet, or some other network. The invention may also be utilized by a mobile user to send short audio messages to a message center and/or a second end user device.

83 Claims, 4 Drawing Sheets

USING DISCRETE MESSAGE-ORIENTED SERVICES TO DELIVER SHORT AUDIO COMMUNICATIONS

FIELD OF THE INVENTION

The present invention relates to delivery of audio messages to or from remote receiving units such as mobile telephones and, in particular, to a method for using Short Message Service or other discrete message-oriented services to deliver audio messages.

BACKGROUND OF THE INVENTION

A mobile phone user, like other telephone users, generally must place a call to a voice mail system in order to receive audio messages. This has obvious disadvantages, chief among them being that the user must actively solicit the information that he or she has received a message by calling directly into the voice mail system. Frequently, the user will incur toll and/or air time charges to do so, only to discover that there are no messages waiting. The only other widely available method for receiving audio messages is through a physical connection to the messaging system. Such connections are costly in the use of resources, and clearly defeat the major advantage and intent of a mobile telephone or other remote receiving unit.

Short Message Service (SMS) is a standard feature on the Vodaphone and most other digital networks. SMS is currently utilized only to deliver messages to mobile stations as short text messages. Clearly, this method of messaging is not readily usable by the visually impaired.

In Short Message Service, as currently defined in various standards such as GSM (Global System for Mobile Communications) [see, e.g., TIA/EIA/IS-637, Short Message Services for Wide Band Spread Spectrum Cellular Systems, 1995; TIA/EIA/TSB-79, Short Message Services for Wide Band Spread Spectrum Cellular Systems, 1997 (an update to IS-637); TS GSM 03.40, Digital cellular telecommunications system, Technical realization of the Short Message Service (SMS); Point-to-Point (PP)], short digital messages are captured on behalf of an end user, such as the user of a wireless telephone device. This capture can be time-consuming and frequently error-prone, generally requiring the message sender to have access to, and the ability to use, a text entry system such as a personal computer. The messages are then stored in a messaging center until the end user is ready for delivery, and then each message is delivered as a text message to the user at the end user remote station. Commonly, such delivery is done while the end user device is not otherwise in use by the user, but it can also be accomplished in parallel with, and independently of, some other ongoing activity at the end user device.

Although discrete messages sent by SMS are often limited to 160 characters, the length and number of complete messages that can be supported by an application are generally a function of the amount of memory built into the handset or other end user device, as well as of the practical limits imposed by the configuration of the network. The limits for both are rapidly increasing, for example, some handsets today purport to incorporate a Web browser.

Generally, the handset or other device indicates that a message has been received by emitting a short beep or by providing a visual indication on a display. Often, the user needs to press a button in order to read the message. If the handset memory is full, additional messages will be held by the network until sufficient messages have been deleted at the handset to allow room for new messages to be received.

Short Message Service capability is two-way, i.e. a digital mobile phone user can both receive and send short text messages utilizing this technology. To send a message, the mobile phone user generally needs to select among several menu options and then create the desired message using the handset's alphanumeric keypad or an associated personal computer. As with the creation of messages to be sent to the end user, this method is time-consuming and frequently error-prone.

What has been needed, therefore, is a way to conveniently send audio messages directly to and from the user of a remote receiving unit. Accordingly, a primary object of the present invention is to provide a method for delivering and receiving audio messages to and from digital remote station users. In particular, an object of the present invention is to utilize Short Message Service or other existing text message-oriented services to deliver short audio messages.

SUMMARY OF THE INVENTION

A method and apparatus for delivering short audio communications to mobile telephones or other remote receiving devices integrates existing technologies and new communications structures to perform the new function. The scope of this invention includes all use of discrete message-oriented services to deliver audio messages.

In one embodiment of the invention, audio information is captured, the captured information is encoded by means of audio compression technology, and the encoded audio information is stored at a message center or other facility that provides mailbox services to end users. Alternatively, the received audio information may be stored at the message center in an uncompressed format and compressed at a later time, such as at the time of delivery. The compressed audio information is transmitted by means of Short Message Service or another discrete message-oriented service to the end user. The Short Message containing the compressed audio information is received at the end user device, the information is decompressed, and the decompressed audio information is played back to the intended message recipient. Message delivery can be accomplished in parallel with some other ongoing activity at the end user device.

The major fields in a Short Message Service message used to carry encoded audio information are a Type of Data field, indicating that the associated message is an Audio message and including information on the type of translator needed to decompress and decode the message field, a Short Message Identifier providing a non-ambiguous identity to each particular Short Message transaction, a Length field indicating the overall coded message length, and the coded audio information.

If the audio information is too large to be contained in a single Short Message, segmentation and reassembly techniques commonly known in the art are applied to store and/or deliver the audio information to the end user device. Coded audio information that is too long for a single Short Message is broken into segments, each of which is placed into a separate Short Message having the fields: Type of Data; Short Message Identifier; Total Segments; Number of Enclosed Segment; Segment Length; and Coded Audio Information Segment. The Total Segments and Number of Enclosed Segment fields provide the means to identify and reassemble the segments of the coded audio information into the correct order at the end user device. The Length field contains the length of the associated Segment of coded audio information, and the Coded Audio Information field contains the segment itself.

At the end user device, the Short Message is stored until the end user listens to the audio information. At that time, the audio information is reconstituted using the appropriate audio decompression technique. While in the preferred embodiment the end user device is conceived as a digital mobile telephone handset, any voice coding capable device able to receive digital transmissions and convert that transmission to audio output, such as a pager or personal computer would be suitable. Additionally, the intervening network could be the Internet or some other network known in the art, rather than a radio link.

In a preferred embodiment of the system, the audio information is delivered to a Message Center Audio Compression Function within a Message Center, where it is encoded and compressed digitally. The compressed audio information is formatted into one or more Short Messages by the Message Center Short Message Creation Function. Once one or more Short Messages are created to contain the compressed audio information, they are stored by a Message Center Short Message Storage Function until the End User Device is available for delivery. In a preferred embodiment, the Message Center Short Message Storage Function is implemented directly by a computing device, but other technologies known in the art are suitable.

Alternatively, the incoming audio information is stored at the Message Center in an uncompressed format by an Audio Storage Function until such time as the End User Device becomes available. When the End User Device becomes available, the Message Center determines the appropriate audio compression technique to be applied, the stored audio information is compressed, and one or more Short Messages are created for immediate delivery to the End User Device. When the End User Device is available for delivery, a Message Center Short Message Delivery Function-Transmit initiates transmission of the Short Message to the End User Device, where it is received by an End User Short Message Delivery Function-Receive. The specific implementation of this function is determined by the type of receiving device, the transmission medium, and the service protocol being used. Upon successful reception of the message, it is stored locally by an End User Short Message Storage Function.

When the end user listens to the audio information, the audio information is decompressed by the End User Audio Decompression Function and relayed to the end user through the handset or other output apparatus of the End User Device. The End User Audio Decompression Function is chosen to match the method of audio compression utilized by the Message Center Audio Compression Function at the Message Center. The receiving end user may listen to the audio information multiple times, so long as the message continues to be stored in the End User Short Message Storage Function. When the end user no longer needs to retain the message, the message may be deleted in order to make memory available for the receipt of additional messages.

The mobile user may also utilize this invention to be the initiator of a short audio message to a second end user device, with the functions being implemented in a manner analogous to that for Message Center to End User transmission.

DETAILED DESCRIPTION

Figure 1:
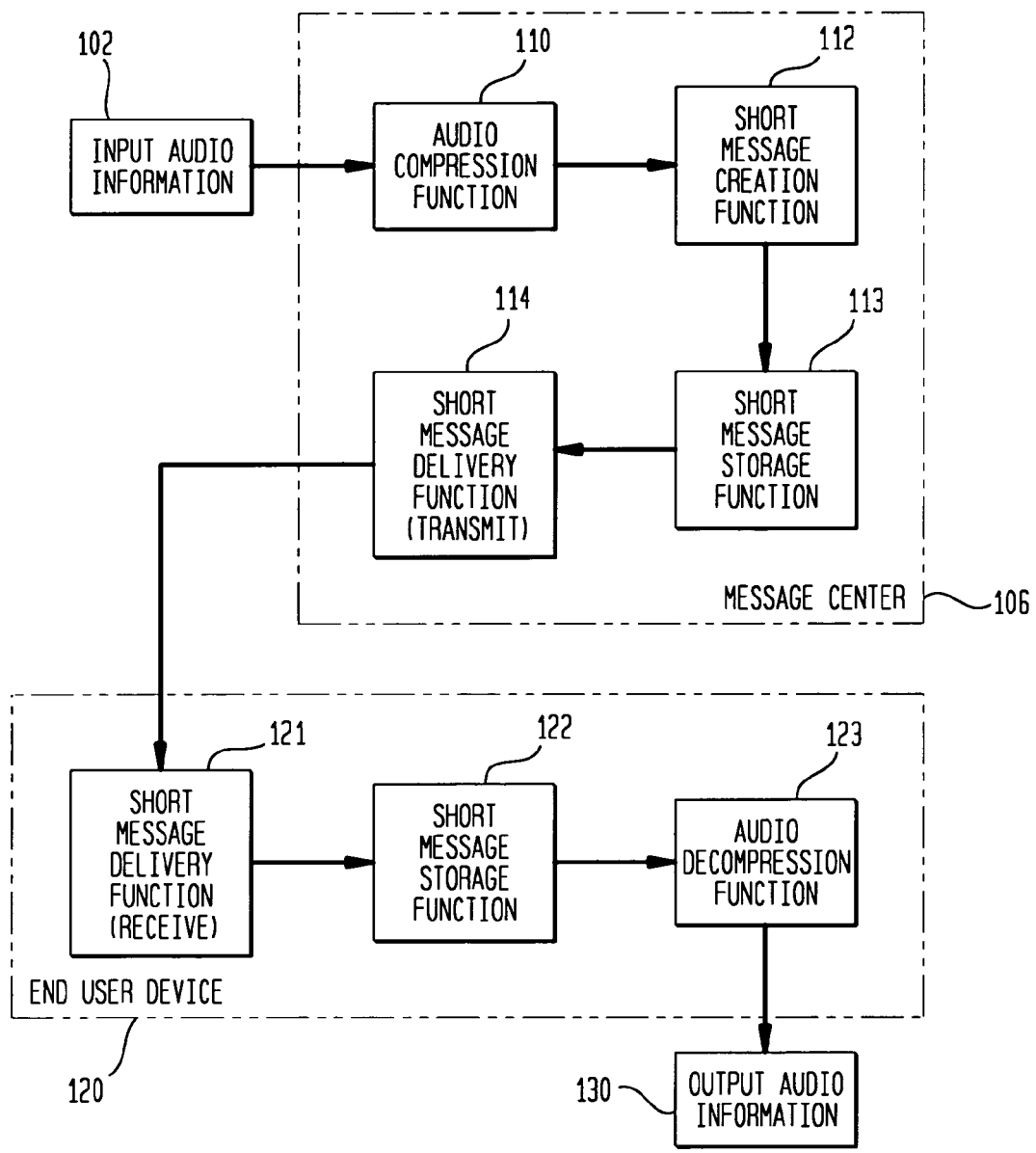
FIG. 1 is a block diagram of an embodiment of a system for using Short Message Service to deliver an audio message to an end user device according to one embodiment of the method of the present invention.

This invention allows audio messages to be sent to and from remote receiving devices such as mobile telephones, through the adaptation of already existing technologies, in combination with new communications structures, in order to provide new functions. In a preferred embodiment of the invention, a short audio message, e.g., "Call home, emergency!", is encoded and delivered directly to a digital mobile station via Short Message Service or another discrete message-oriented service. The audio message is subsequently played back to the recipient by utilizing the decoding technology already located in the mobile station. Such audio messages can be delivered to a mobile phone unit even while the intended recipient is engaged on another call, and can be played back as often as the end user desires. The invention can be utilized both for short audio messages or for audio messages in combination with longer voice mail messages and text. Two way audio messages and audio paging are also supported.

Among other advantages, this invention allows individuals with visual difficulties to remotely receive Short Messages and/or pages. This invention is useful for both the paging and the voice mailbox markets. It can be built into any message center or mobile phone that supports digital voice encoding and discrete message-oriented service, and is an integration of these existing technologies with new structures in order to support new services. This invention is easily codified into mobile phone standards; in a preferred implementation it would be incorporated into the Short Message standard(s) worldwide. The scope of the invention includes all use of discrete messaging to deliver audio information, including all use of discrete message-oriented services to deliver audio messages, discrete message-oriented service being such as, but not limited to, the Short Message Service already defined in various standards.

In a preferred embodiment of the invention, a segment of audio information is first captured, the captured information is encoded by means of any audio compression technology known in the art, such as the technology used in voice coding schemes on wireless networks, and the compressed information is stored at a message center or other facility that provides mailbox services to end users. Many techniques for compressing and encoding voice signals for digital transmission are well-known in the art, and it is contemplated that any of these techniques may be used to perform the audio compression function of the invention.

As a general proposition, in each of these compression techniques a voice signal is prepared for digital transmission by band-limiting and sampling at a convenient pre-specified frequency (such as 8 kHz). Each sample is then encoded into multi-bit PCM for transmission. At the receiver, the sample is then decoded in order to recreate the original voice signal. The encoding of the audio information by common compression techniques allows the audio information to be optionally stored at the messaging center in an efficient manner while awaiting delivery to the intended recipient. Alternatively, the received audio information may be optionally stored at the message center in an uncompressed format and compressed at a later time, such as at the time of delivery.

The compressed audio information is next transmitted by means of Short Message Service or another discrete message-oriented service to the end user. The Short Message containing the compressed audio information is received at an end user device, the audio information is decompressed, and the decompressed audio information is played back to the end user (the intended message recipient). The transmission scheme used by the preferred embodiment of this invention is Short Message Service or any other discrete message-oriented service wherein Short Messages are captured on behalf of an end user, stored in a messaging center until the end user device is available to receive delivery, and then delivered digitally to the end user, such as the user of a digital wireless telephone device. Commonly, such delivery is done in a connectionless manner while the end user device is not otherwise in use by the user, but it can also be accomplished in parallel with, and independently of, some other ongoing activity at the end user device.

Figure 4:
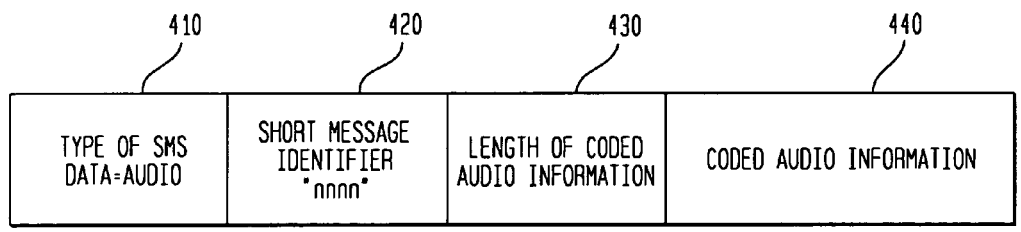
FIG. 4 illustrates the major fields of an embodiment of a Short Message Service message being used to carry coded audio information according to the present invention.

The Short Message containing all or portions of the encoded audio information also contains a type field that indicates the contents of the Short Messages, as well as the type of audio decompression technique necessary to reconstitute the audio information. As seen in FIG. 4, the major fields in a Short Message Service message used to carry coded audio information are a Type of Data field 410, indicating that the associated message is an Audio message and including information on the type of translator needed to decompress and decode the message field in order to retrieve the audio message, a Short Message Identifier field ("nnnn") 420 that is specified by the SMS or other standard, a Length field 430 indicating the overall coded message length, and the coded audio information 440. This embodiment of a message according to the invention assumes that all of the coded audio information 440, plus the Type of Data 410, Identifier 420, and Length 430 fields, will fit into a single SMS message sent across one or more intervening networks between a Message Center and the end user's equipment (e.g., a mobile phone, PC, etc.).

The size and format of the Type of Data 410 and Short Message Identifier 420 fields would be expected to be specified by the SMS standard according to the existing SMS conventions. The Length field 430 might also be specified by the SMS standard, and would preferably be at least 2 bytes long. The actual content of the Short Message Identifier field 420 is under the control of the Message Center or the end user device and can be a numeric value, a text string, or some combination. The Identifier 420 provides a non-ambiguous identity to each particular Short Message transaction, and both the transmitting and receiving ends can use the Identifier 420 to refer to that particular Short Message for, e.g., purposes of retransmission, acknowledgment, error notification, rejection, etc.

The Type of Data field 410 is typically one or two bytes containing a binary value. The meaning of the binary value is preferably defined by the SMS or other standard, or by some other mutual agreement, e.g., by agreement between the manufacturer/operator of the Message Center and the manufacturer/operator of the end user device. The information on the type of translator required is incorporated into this value, some examples being: "SMS Audio Info—CDMA 13k Vocoder" or "SMS Audio Info—GSM Enhanced Full Rate Vocoder". Each type of translator is represented by a separate value, so that there is a set of "SMS Audio Info—xxx" agreed-upon values. As a new translator type is integrated into the scheme, a new item is added to the list of possible Type of Data values.

It is possible for the audio information received to be too large to be contained in a single Short Message, even though the end user device and the message center might be capable of handling larger messages. In such a case, segmentation and reassembly techniques commonly known in the art are applied to store and/or deliver the audio information to the end user device. The handling of a Short Message containing information too long to be transmitted in a single message across the intervening network(s) between the Message Center and the end user's equipment can be done in at least two ways. In one, the Short Message Service provides segmentation and reassembly of any Short Message that exceeds intervening network size limits. Employment of this well known technique requires no special features for handling coded audio information. In a second, the segmentation and reassembly process is carried out by the two endpoints which are transmitting and receiving the coded audio information. In this method, well known segmentation and reassembly techniques can also be applied.

Figure 5:
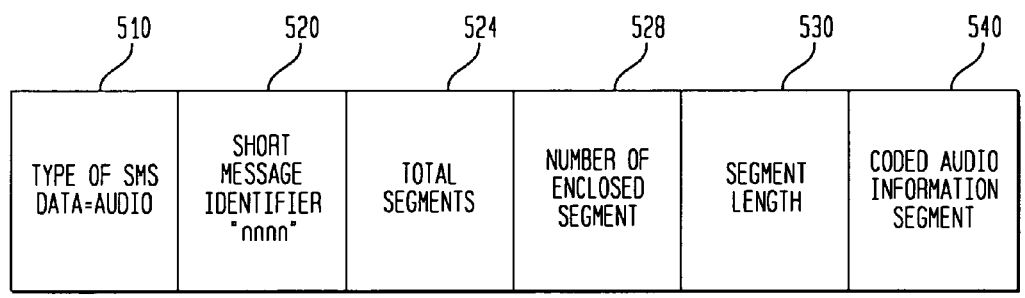
FIG. 5 illustrates the major fields of an embodiment of a Short Message Service message being used according to the invention to carry a segment of a coded audio message that is too long for a single Short Message Service message.

As shown in FIG. 5, coded audio information that is too long for a single Short Message is broken into segments, for example, into Segment 1 of 3, Segment 2 of 3, and Segment 3 of 3. Each of these segments is then placed into a separate Short Message having the following fields: Type of Data=Audio (again including identification of the type of translator necessary to reconstitute the audio information) 510; Short Message Identifier "nnnn" 520; Total Segments 524; Number of Enclosed Segment 528; Segment Length 530; and the Coded Audio Information Segment 540. The Type of Data field 510 is the same as for a non-segmented message. The Short Message Identifier 520 for a segmented message provides both a means of identifying the particular activity between the Message Center and end user, and a means of identifying the messages containing the various segments of the same coded audio information message. The Total Segments field 524 and the Number of Enclosed Segment field 528 provide the means to identify and then correctly reassemble the segments of the coded audio information into the correct order at the end user device. The Length field 530 contains the length of the associated segment of coded audio information, and the Coded Audio Information field 540 contains the segment itself.

At the end user device, the contents of the Short Message(s) are optionally stored until the end user chooses to listen to the audio information. At that time, the audio information is reconstituted by using the appropriate audio decompression technique, e.g., by passing the compressed audio information through a voice decoder within the end user device, and playing the resulting sounds over the speaker system of the end user device. While in the preferred embodiment the end user device is conceived as a digital mobile telephone handset, any voice coding capable device able to receive digital transmissions and convert that transmission to audio output, such as a pager or personal computer would be suitable. Additionally, the intervening network could be the Internet or some other network known in the art, rather than a radio link.

As shown in FIG. 1, in a preferred embodiment of the system the audio information 102, such as a spoken phrase, is delivered to the Message Center Audio Compression Function 110 within a Message Center 106, where it is encoded and compressed digitally. The Message Center 106 will commonly be some form of voice mailbox system that provides messaging services and/or paging to the user and is attached to the intervening network by any of the variety of export techniques known in the art for providing end-to-end delivery of digital data, including, but not limited to: Internet, signaling systems, and wireless (radio, etc.).

The Message Center Audio Compression Function 110 may be implemented by any of the devices and methods known in the art that have the capability of encoding and compressing audio signals to produce a digital signal as an output. The input begins as a normal speech path and is converted to compressed digital via devices internal to the Message Center that perform the compression function 110. Examples are any of the various vocoders utilized by mobile phones in the industry already, such as the GSM Full-Rate Voice Coder, GSM Half-Rate Voice Coder, GSM Enhanced Full-Rate Voice Coder, 13 KB IS95 Voice Coder, 8 KB IS95 Voice Coder, EVRC Voice Coder, and the IS136 8 KB Voice Coder.

The compressed audio information is then formatted into one or more Short Messages by the Message Center Short Message Creation Function 112. The Message Center Short Message Creation Function 112 is implemented by any of the devices and methodologies know in the art for implementing a Short Message or other discrete message-oriented service, such as SMS, where a header and length field wrap the actual message during transmission. Examples of these are found in the TDMA, CDMA and GSM standards.

As previously described, if the compressed audio information is too long to be contained in a single Short Message, it can be segmented into multiple Short Messages utilizing any common methodology known in the art. For example, SMS has a segmentation and reassembly feature already built in. Alternatively, a separate segmentation/reassembly capability can be provided as part of the invention, operating to divide the audio message into segments and put the segments into separate Short Messages, each Short Message having an indicator signaling that the segment contained within the Short Message is a particular segment number out of some total number of segments. The limit on the length of the total compressed audio information which can be sent or received is an operational consideration that may vary depending on the physical storage facilities available in the Message Center Short Message Storage Function 113, on the facilities that will be used to deliver the Short Message(s), on the receiving equipment, and/or on the user's subscription. In the latter case, it is anticipated that different pricing categories will be available. For example, the user may subscribe to a service having a 2-second message limit versus a (more expensive) 10-second message limit.

Once one or more Short Messages are created to contain the compressed audio information, they are optionally stored by a Message Center Short Message Storage Function 113 until the End User Device 120 is available for delivery. In a preferred embodiment, the Message Center Short Message Storage Function 113 is implemented directly by a computing device (e.g. hard disk), but other technologies known in the art, such as computer RAM or other computer-based storage medium, such as CD-ROM, would be suitable. Alternatively, the Storage Function 113 can be implemented as a simple box having chips with volatile and/or nonvolatile memory (e.g. Flash RAM).

At the time that the End User Device 120 becomes available for delivery, a Message Center Short Message Delivery Function-Transmit 114 initiates transmission of the Short Message(s) to the End User Device 120, where they are received by an End User Short Message Delivery Function-Receive 121. This function is standard to SMS, but the specific implementation used is actually determined by the type of receiving device, the transmission medium, and the service protocol being used. For example, if the message is being delivered to a mobile unit, the SMS protocol might be used, but if it is being delivered to a personal computer over the Internet, then IP (Internet Protocol) addressing would likely be used. Upon successful reception of the message(s), they are optionally stored locally by an End User Short Message Storage Function 122. The End User Short Message Storage Function 122 is typically implemented in the memory located at the mobile unit, but could also be implemented by any other suitable technology known in the art. The storage medium may be either volatile or nonvolatile, just as for storage of text messages, as is currently already available in phone devices capable of receiving SMS messages.

When the end user chooses to listen to the audio information, the audio information is decompressed by the End User Audio Decompression Function 123 and relayed 130 to the end user through the handset or other output apparatus of the End User Device 120. The implementation details of the End User Audio Decompression Function 123 are essentially preset, being chosen to match the method of audio compression utilized by the Message Center Audio Compression Function 110 at the Message Center 106.

The specific type of compression/decompression used will normally depend on the capabilities of the end user equipment. Mobile phones generally have voice coders already built into the handset. Some of the newer mobile units are capable of handling more than one type of compression/decompression, in which case the type selected would normally be whichever of the supported types is most efficient under the circumstances. Information about the type of equipment in use by the end user is preferably stored into a "User Profile" in a database at the time the subscription is entered, with the Message Center retrieving this information in order to determine what method(s) to use to compress and transmit the message to the end user.

The receiving end user may listen to the audio information multiple times, so long as the message(s) continue to be stored in the End User Short Message Storage Function 122. When the end user no longer needs to retain a message, the message may be deleted in order to make memory available in the end user device for the receipt of additional messages. This delete process is the same as for existing Short Message Service or other discrete message-oriented services, with the compressed signals being deleted from the memory source utilized by the End User Short Message Storage Function 122.

Figure 2:
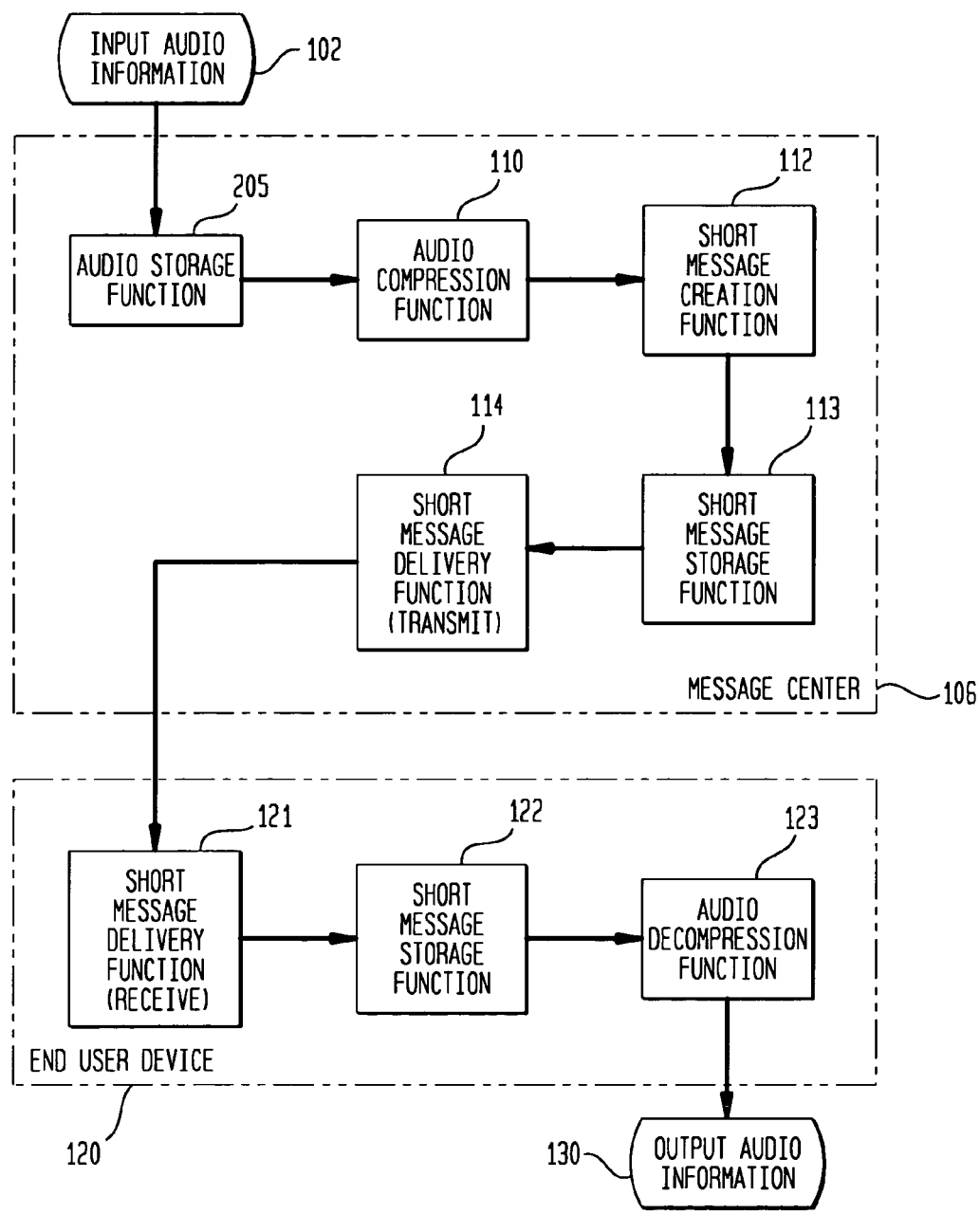
FIG. 2 is a block diagram of another embodiment of a system for using Short Message Service to deliver an audio message to an end user device according to an embodiment of the present invention.

Alternatively, in the embodiment of a system for performing the method illustrated in FIG. 2, the incoming audio information is optionally stored in an uncompressed format at the Message Center 106 by an Audio Storage Function 205 until such time as the End User Device 120 becomes available. The Audio Storage Function 205 is typically implemented by audio tape, CD, or, after conversion to a full digital signal, a disk memory device (e.g. hard disk, digital tape, memory), but any of the methods of audio signal storage known in the art would be suitable and are contemplated by the inventor.

When the End User Device 120 becomes available, the Message Center 106 determines the appropriate audio compression technique to be applied by examining the Type of Data information stored for the intended recipient in the "User Profile" database. The stored audio information is then compressed and one or more Short Message(s) are created for immediate delivery to the End User Device 120 by means of communications between the Message Center Short Message Delivery Function-Transmit 114 and the End User Short Message Delivery Function-Receive 121.

Note that, in the embodiment of FIG. 2, the audio information is delivered 102 to the Message Center 106 where it is stored uncompressed by Audio Storage Function 205. When the End User Device 120 becomes available, the stored audio information is only then processed by the Message Center Audio Compression Function 110, where it is encoded and compressed digitally. The compressed audio information is then formatted into one or more Short Messages by the Message Center Short Message Creation Function 112. As before, if the compressed audio information is too long to be contained in a single Short Message, it can be segmented into multiple Short Messages, utilizing any of the methodologies described above.

Once one or more Short Messages are created to contain the compressed audio information, the Message Center Short Message Delivery Function-Transmit 114 initiates transmission of one or more Short Messages to the End User Device 120 where they are received by the End User Short Message Delivery Function-Receive 121. Upon successful reception of one or more Short Messages, they are optionally stored locally by the End User Short Message Storage Function 122. When the end user chooses to listen to the audio information, the audio information is decompressed by End User Audio Decompression Function 123 and then played 130 to the recipient user.

Figure 3:
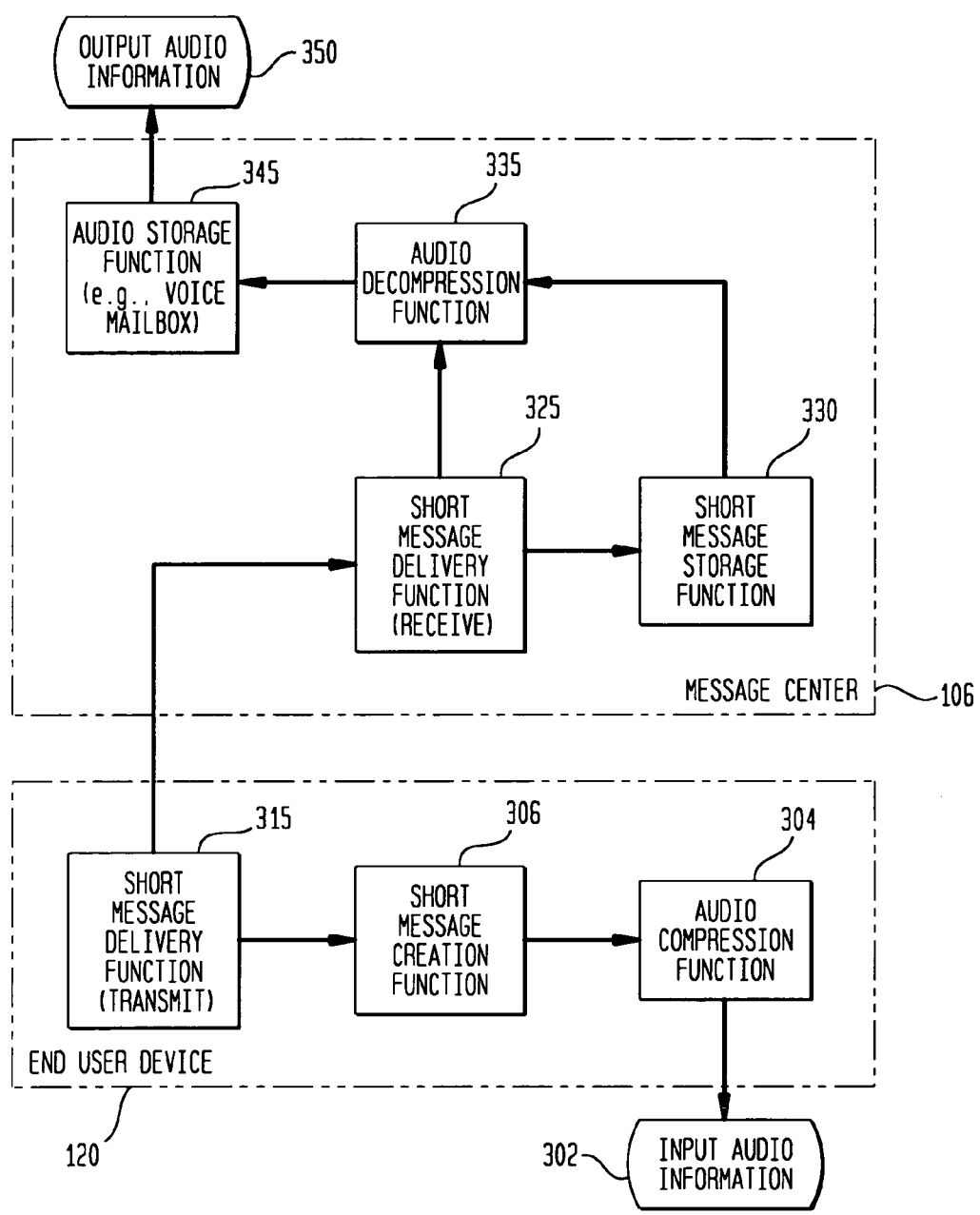
FIG. 3 illustrates delivery of a short audio message from an end user device to the network according to the method of the present invention.

The mobile user may also be the initiator of a short audio message utilizing this invention, either as a reply to a received message or independently. As illustrated in FIG. 3, the flow of the audio information is from the End User Device 120 to the Message Center 106 for subsequent delivery to a second end user. That subsequent delivery may be accomplished by reconstitution of the compressed audio information and optional storage in a voice mailbox, or by storage of the compressed audio information for delivery by means of Short Messages.

In a preferred embodiment of the invention having this capability, illustrated in FIG. 3, the audio information is delivered 302 to the End User Audio Compression Function 304 of the End User Device 120, where it is encoded and compressed digitally. The End User Audio Compression Function 304 may be successfully implemented utilizing any of the methods or technologies discussed as being suitable for the implementation of the Message Center Audio Compression Function 110.

The compressed audio information is then formatted into one or more Short Messages by the End User Short Message Creation Function 306. The End User Short Message Creation Function 306 may be successfully implemented utilizing any of the methods or technologies discussed as being suitable for the implementation of the Message Center Short Message Creation Function 112. If the compressed audio information is too long to be contained in a single Short Message, it can be segmented into multiple Short Messages, utilizing any of the methods and technologies previously discussed. As before, the limit on the length of the total compressed audio information that may be processed at one time is an operational consideration that may vary depending on the facilities that will be used to deliver the Short Message(s) and on either user's subscription.

Once one or more Short Messages are created to contain the compressed audio information, the End User Short Message Delivery Function-Transmit 315 initiates transmission of the Short Message(s) to the Message Center 106 where they are received by the Message Center Short Message Delivery Function-Receive 325. Both the End User Transmit 315 and Receive 325 Functions may be successfully implemented utilizing any of the technologies and methods discussed for the Message Center Transmit 114 and Receive 121 Functions.

Upon successful reception of one or more Short Message(s), they are optionally stored locally by the Message Center Short Message Storage Function 330. The compressed audio information may alternatively be passed immediately to the Message Center Audio Decompression Function 335. Both of these functions may similarly be implemented according to the technologies and methods previously discussed in conjunction with the End User Device.

At a later time, the Short Message(s) may be either passed to the Message Center Audio Decompression Function 335, or may be sent to another end user using the same techniques discussed in conjunction with the previous embodiments. After the Message Center Audio Decompression Function 335, which reconstitutes the compressed audio information, the audio information is optionally stored by the Message Center Audio Storage Function 345 while awaiting delivery 350 to the intended recipient. Immediately, or at a later time, the reconstituted audio information may again be processed into compressed audio information using the techniques described in conjunction with the embodiments previously disclosed.

What has been described is merely illustrative of the application of the principles of the present invention. Other arrangements, methods, modifications and substitutions by one of ordinary skill in the art are also considered to be within the scope of the present invention, which is not to be limited except by the claims which follow.

What is claimed is:

1. A method for receiving at least one audio message at a remote receiving device comprising, in combination, the steps of:
   receiving at least one discrete message-oriented service message containing a digitized and compressed audio message at said remote receiving device;
   decompressing and decoding said digitized and compressed audio message at said remote receiving device;
   replaying said decompressed and decoded received audio message to an intended recipient at said remote receiving device, wherein if said received audio message is a segmented one of said discrete message-oriented service messages, receiving the remaining ones of said segments; and
   reassembling said received audio message from said segments.

2. A method for delivery of at least one audio message from a remote device to a message center, comprising, in combination, the steps of:
   digitizing and compressing an audio message at said remote device;

placing said digitized and compressed audio message into the message field of at least one discrete message-oriented service message;

transmitting said discrete message-oriented service message from said remote device to said message center, wherein if said digitized and compressed audio message is too long to fit into a single one of said discrete message-oriented service messages, breaking said digitized and compressed audio message into segments; and placing each of said segments into a separate one of said discrete message-oriented service messages.

3. A method for receiving at least one audio message at a message center from a remote device comprising, in combination, the steps of:

receiving at least one discrete message-oriented service message containing a digitized and compressed audio message from said remote device;

decompressing and decoding said digitized and compressed audio message at said message center; and relaying said decompressed and decoded audio message from said message center to an intended recipient, wherein said discrete message-oriented service message is a Short Message Service message.

4. An apparatus for delivery of at least one audio message comprising, in combination:

means for digitizing and compressing an audio message;

means for placing said digitized and compressed audio message into the message field of at least one discrete message-oriented service message;

means for breaking said audio message into segments small enough to be contained in one of said discrete message-oriented messages; and means for identifying related segments in a plurality of said discrete message-oriented messages.

5. The apparatus of claim 4, further comprising means for storing said audio message until it is time for said audio message to be transmitted.

6. The apparatus of claim 5, wherein said means for storing said audio message stores said message in a digitized and compressed form.

7. The apparatus of claim 5, wherein said means for storing said audio message stores said message in an analog form.

8. The apparatus of claim 4, further comprising means for replaying said audio message.

9. The apparatus of claim 8, further comprising means for storing said audio message until it is time for said audio message to be replayed.

10. The apparatus of claim 9, wherein said means for storing said audio message stores said message in a digitized and compressed form.

11. The apparatus of claim 9, wherein said means for storing said audio message stores said message in an analog form.

12. The apparatus of claim 4, further comprising means for storing said audio message.

13. The apparatus of claim 12, wherein said means for storing said audio message stores said message in a digitized and compressed form.

14. The apparatus of claim 12, wherein said means for storing said audio message stores said message in an analog form.

15. An apparatus for receipt of at least one audio message comprising, in combination:

means for receiving at least one discrete message-oriented service message containing a digitized and compressed audio message;

means for decoding and decompressing said audio message;

means for breaking an audio message into segments small enough to be contained in one of said discrete message-oriented messages;

means for identifying related segments in a plurality of said discrete message-oriented messages;

means for identifying whether an audio message contained in one of said discrete message-oriented messages is one of a plurality of segments of a longer audio message; and means for reassembling said plurality of segments to obtain said longer audio message.

16. The apparatus of claim 15 further comprising means for transmitting said discrete message-oriented service message to a remote receiving device.

17. The apparatus of claim 16, further comprising means for storing said audio message until it is time for said audio message to be transmitted.

18. The apparatus of claim 17, wherein said means for storing said audio message stores said message in a digitized and compressed form.

19. The apparatus of claim 17, wherein said means for storing said audio message stores said message in an analog form.

20. A method for delivery of at least one audio message comprising, in combination, the steps of:

digitizing and compressing an audio message;

placing said digitized and compressed audio message into the message field of at least one discrete message-oriented service message; and transmitting said discrete message-oriented service message to a remote receiving device wherein if said digitized and compressed audio message is too long to fit into a single one of said discrete message-oriented service messages, breaking said digitized and compressed audio message into segments, and placing each of said segments into a separate one of said discrete message-oriented service messages.

21. The method of claim 20, further comprising the step of storing said audio message until it is time for said audio message to be delivered.

22. The method of claim 21, wherein said audio message is stored after digitization and compression.

23. The method of claim 21, wherein said audio message is stored before digitization and compression.

24. The method of claim 20, further comprising the step of storing said audio message at said remote receiving device.

25. The method of claim 24, further comprising the step of decompressing and decoding said digitized and compressed audio message at said remote receiving device.

26. The method of claim 20, further comprising the steps, in combination, of:

storing said audio message until it is time for said audio message to be transmitted; and storing said audio message at said remote receiving device.

27. The method of claim 26, further comprising the step of decompressing and decoding said digitized and compressed audio message at said remote receiving device.

28. The method of claim 27, further comprising the step of replaying said decompressed and decoded audio message at said remote receiving device.

29. The method of claim 20, wherein said discrete message-oriented service message is a Short Message Service message.

30. The method of claim 20, wherein said remote receiving device is a mobile telephone or an audio pager.

31. The method of claim 20, wherein said remote receiving device is a personal computing device.

32. The method of claim 20, further comprising the step of receiving a reply message from said remote receiving device.

33. The method of claim 20, wherein said discrete message-oriented service message is transmitted over an Internet-type connection.

34. A method for delivery of at least one audio message comprising, in combination, the steps of:
digitizing and compressing an audio message;
placing said digitized and compressed audio message into the message field of at least one discrete message-oriented service message;
transmitting said discrete message-oriented service message to a remote receiving device;
decompressing and decoding said digitized and compressed audio message at said remote receiving device;
replaying said decompressed and decoded audio message at said remote receiving device wherein if said digitized and compressed audio message is too long to fit into a single one of said discrete message-oriented service messages, breaking said digitized and compressed audio message into segments;
placing each of said segments into a separate one of said discrete message oriented service messages; and
reassembling said digitized and compressed message from said segments after said discrete message-oriented service messages are received at said remote receiving device.

35. The method of claim 34, further comprising the step of storing said audio message until it is time for said audio message to be transmitted.

36. The method of claim 35, wherein said audio message is stored after digitization and compression.

37. The method of claim 35, wherein said audio message is stored before digitization and compression.

38. The method of claim 34, wherein said discrete message-oriented service message is a Short Message Service message.

39. The method of claim 34, wherein said audio messages are replayed at said remote receiving device in combination with text messages.

40. The method of claim 34, further comprising the step of sending a reply message from said remote receiving device in response to a received one of said audio messages.

41. The method of claim 40, wherein said step of sending a reply message comprises the steps, in combination, of:
digitizing and compressing a reply audio message at said remote receiving device;
placing said digitized and compressed reply audio message into the message field of at least one reply discrete message-oriented service message; and
transmitting said reply discrete message-oriented service message from said remote receiving device in response to said received audio message.

42. A method for delivery of at least one audio message comprising, in combination, the steps of:
digitizing and compressing an audio message;
placing said digitized and compressed audio message into the message field of at least one discrete message-oriented service message;
transmitting said discrete message-oriented service message to a remote receiving device wherein the transmitting is to a remote receiving device for decompression, decoding, and replaying to an intended recipient wherein if said digitized and compressed audio message is too long to fit into a single one of said discrete message-oriented service messages, breaking said digitized and compressed audio message into segments; and
placing each of said segments into a separate one of said discrete message-oriented service messages for later reassembly at said remote receiving device.

43. The method of claim 42, further comprising the step of storing said audio message until it is time for said audio message to be transmitted.

44. The method of claim 43, wherein said audio message is stored after digitization and compression.

45. The method of claim 43, wherein said audio message is stored before digitization and compression.

46. The method of claim 42, wherein said discrete message-oriented service message is a Short Message Service message.

47. The method of claim 42, wherein said remote receiving device is a mobile telephone or an audio pager.

48. The method of claim 42, wherein said remote receiving device is a personal computing device.

49. The method of claim 42, wherein said discrete message-oriented service message is transmitted over an Internet-type connection.

50. A method for receiving at least one audio message at a remote receiving device comprising, in combination, the steps of:
receiving at least one discrete message-oriented service message containing a digitized and compressed audio message at said remote receiving device;
decompressing and decoding said digitized and compressed audio message at said remote receiving device;
sending a reply message from said remote receiving device in response to a received one of said audio messages, wherein said step of sending a reply message comprises the steps, in combination, of:
digitizing and compressing a reply audio message at said remote receiving device;
placing said digitized and compressed reply audio message into the message field of at least one reply discrete message-oriented service message;
transmitting said reply discrete message-oriented service message from said remote receiving device in response to said received audio message;
replaying said decompressed and decoded audio message to an intended recipient at said remote receiving device wherein f said digitized and compressed reply audio message is too long to fit into a single one of said reply discrete message-oriented service messages, breaking said digitized and compressed reply audio message into segments; and
placing each of said segments into a separate one of said reply discrete message-oriented.

51. The method of claim 50, further comprising the step of storing said audio message at said remote receiving device until it is time for said audio message to be replayed.

52. The method of claim 50, wherein said remote receiving device is a mobile telephone or an audio pager.

53. The method of claim 50, wherein said discrete message-oriented service message is transmitted via an Internet-type connection.

54. The method of claim 50, wherein said discrete message-oriented service message is a Short Message Service message.

55. A method for delivery of at least one audio message from a remote device to a message center, comprising, in combination, the steps of:
digitizing and compressing an audio message at said remote device;
placing said digitized and compressed audio message into the message field of at least one discrete message-oriented service message;
transmitting said discrete message-oriented service message from said remote device to said message center, if said digitized and compressed audio message is too long to fit into a single one of said discrete message-oriented service messages, breaking said digitized and compressed audio message into segments; and
placing each of said segments into a separate one of said discrete message-oriented service messages.

56. The method of claim 55, further comprising the step of storing said audio message at said remote device until it is time for said audio message to be transmitted.

57. The method of claim 56, wherein said audio message is stored after digitization, and compression.

58. The method of claim 56, wherein said reply audio message is stored before digitization and compression.

59. The method of claim 55, wherein said remote device is a mobile telephone or an audio pager.

60. The method of claim 55, wherein said discrete message-oriented service message is a Short Message Service message.

61. The method of claim 55, wherein said discrete message-oriented service message is transmitted over an Internet-type connection.

62. The method of claim 55, further comprising the step of decompressing and decoding said digitized and compressed audio message at said message center.

63. The method of claim 62, further comprising the step of relaying said decompressed and decoded audio message from said message center to an intended recipient.

64. The method of claim 63, further comprising the step of sending a reply message from said message center in response to a received one of said audio messages.

65. The method of claim 64, wherein said step of sending a reply message comprises the steps, in combination, of:
digitizing and compressing a reply audio message at said message center;
placing said digitized and compressed reply audio message into the message field of at least one reply discrete message-oriented service message; and
transmitting said reply discrete message-oriented service message from said message center in response to said received audio message.

66. The method of claim 55, further comprising the step of receiving a reply message from said message center in response to a transmitted one of said audio messages.

67. The method of claim 55, wherein said remote device is a personal computing device.

68. A method for receiving at least one audio message at a message center from a remote device comprising, in combination, the steps of:
receiving at least one discrete message-oriented service message containing a digitized and compressed audio message from said remote device;
decompressing and decoding said digitized and compressed audio message at said message center;
relaying said decompressed and decoded audio message from said message center to an intended recipient;
sending a reply message from said message center in response to a received one of said audio messages, wherein said step of sending a reply message comprises the steps, in combination, of:
digitizing and compressing a reply audio message at said message center;
placing said digitized and compressed reply audio message into the message field of at least one reply discrete message-oriented service message; and
transmitting said reply discrete message-oriented service message from said message center in response to said received audio message, if said digitized and compressed reply audio message is too long to fit into a single one of said reply discrete message-oriented service messages, breaking said digitized and compressed reply audio message into segments; and
placing each of said segments into a separate one of said reply discrete message-oriented service messages.

69. The method of claim 68 wherein said discrete message-oriented service message and said reply discrete message-oriented service messages are transmitted via an Internet-type connection.

70. The method of claim 68, wherein said discrete message-oriented service message is transmitted via an Internet-type connection.

71. The method of claim 68, wherein said remote device is a personal computing device.

72. The method of claim 68, further comprising the step of storing said audio message at said message center until it is time for said audio message to be relayed to said intended recipient.

73. The method of claim 72, wherein said audio message is stored after digitization and compression.

74. The method of claim 72, wherein said reply audio message is stored before digitization and compression.

75. The method of claim 68, wherein said remote device is a mobile telephone or an audio pager.

76. The method of claim 68, wherein said discrete message-oriented service message is a Short Message Service message.

77. The method of claim 68, wherein said discrete message-oriented service message and said reply discrete message-oriented service messages are Short Message Service messages.

78. The method of claim 68 further comprising the steps, in combination, of:
if said received audio message is a segmented one of said discrete message-oriented service messages, receiving the remaining ones of said segments; and
reassembling an audio message from said received segments.

79. An apparatus for receipt of at least one audio message comprising, in combination:
means for receiving at least one discrete message-oriented service message containing a digitized and compressed audio message;
means for decoding and decompressing said audio message
means for breaking an audio message into segments small enough to be contained in one of said discrete message-oriented messages;
means for identifying related segments in a plurality of said discrete message-oriented messages;

means for identifying whether an audio message contained in one of said discrete message-oriented messages is one of a plurality of segments of a longer audio message; and means for reassembling said plurality of segments to obtain said longer audio message.

80. The apparatus of claim 79, further comprising means for transmitting a discrete message-oriented service message to a remote receiving device.

81. The apparatus of claim 79, further comprising means for storing an audio message.

82. The apparatus of claim 79 further comprising means for replaying an audio message.

83. The apparatus of claim 80, further comprising means for replaying an audio message.

* * * * *